United States Patent [19]

Fowler

[11] 4,197,936
[45] Apr. 15, 1980

[54] CONTINUOUS CONVEYOR BELT CLEANER

[76] Inventor: Cleon R. Fowler, 213 Stevenson Rd., Winterhaven, Fla. 33880

[21] Appl. No.: 876,218

[22] Filed: Feb. 9, 1978

[51] Int. Cl.² .............................................. B65G 45/00
[52] U.S. Cl. .................................................. 198/498
[58] Field of Search ................ 198/497, 498, 499, 598

[56] References Cited

U.S. PATENT DOCUMENTS

| | | | |
|---|---|---|---|
| 1,239,066 | 9/1917 | Winters | 198/498 |
| 1,975,591 | 10/1934 | Sinden | 198/499 |

FOREIGN PATENT DOCUMENTS

| | | | |
|---|---|---|---|
| 2534625 | 2/1976 | Fed. Rep. of Germany | 198/498 |
| 2604382 | 8/1976 | Fed. Rep. of Germany | 198/498 |

*Primary Examiner*—Jeffrey V. Mase
*Attorney, Agent, or Firm*—John Holtrichter, Jr.

[57] ABSTRACT

A device mounted adjacent a moving continuous conveyor belt and including a plurality of separate, symmetrically-spaced cleaning elements in contact with a section of the moving belt, the elements being mounted on a cleaning element holder that is rotatably adjacent the conveyor belt.

12 Claims, 11 Drawing Figures

CONTINUOUS CONVEYOR BELT CLEANER

BACKGROUND OF THE INVENTION

The background of the invention will be set forth in two parts.

1. Field of the Invention

This invention relates to industrial conveyors and more particularly to devices for cleaning moving continuous conveyor belts.

2. Description of the Prior Art

The problem of keeping a moving continuous conveyor belt clean has been present for as long as such devices have been in use. Patents have been issued and many articles published in trade journals on this subject, even before the turn of the century.

By far, the most popular mechanism is a rotating brush mounted below a continuously moving conveyor belt. The bristles of the brush are radially mounted on a brush drum having an axis of rotation parallel to the plane of the conveyor belt but perpendicular to the direction of belt travel. The drum is usually directly driven by an electric motor or belt-driven by a separate motor or by the mechanism that causes the belt to move. The brush sweeps the surface of the belt and generally rotates in a direction to cause the brush bristles to move in a direction opposite to that of the conveyor belt.

The bristles of this type of brush are usually closely spaced and tend to easily collect particles between adjacent bristles and thereby lose much of their cleaning effectiveness. In order to reduce this problem, some prior art mechanisms include what is known as a "flicker bar" which has an elongated blade mounted parallel to the axis of the rotating brush and positioned to just contact the bristle ends in order to "flick" the bristles and dislodge trapped particles and prevent "loading".

Another approach used in solving the problem of removing foreign particles adhering to the surface of a conveyor belt is to utilize a belt cleaner having a series of resilient conical discs mounted on a rotating shaft, the shaft being mounted adjacent and parallel to the belt surface. Particles so removed from the belt tend to be deflected toward and adjacent conical brush segment and means must be provided to prevent a transfer of particles between such conical segments.

More recently, the more or less solid rotating brush configuration has been replaced by a plurality of spaced, helically shaped brush strips mounted on a rotating hub that has an axis parallel to the plane of the conveyor belt. The spacing between the strips helps reduce the loading problem, but in common with the previously mentioned conveyor belt cleaning techniques known to the prior art, this scheme suffers severely from wear and relatively high replacement cost. It should, therefore, be evident that a simple and effective mechanism to clean moving conveyor belts that avoids a tendency to load and has superior longevity would constitute a significant advancement in the art.

SUMMARY OF THE INVENTION

In view of the foregoing factors and conditions characteristic of the prior art, it is a primary object of the present invention to provide a new and improved conveyor belt cleaning device.

Another object of the present invention is to provide a simple, yet effective, conveyor belt cleaning device that avoids a tendency to load its long lasting cleaning elements.

Still another object of the present invention is to provide a relatively low cost yet highly reliable continuous conveyor belt cleaning device.

Yet a further object of the present invention is to provide a unique conveyor belt cleaning device in which its separate cleaning elements rotate circularly to define a spiral path along the face of the moving conveyor belt being cleaned.

In accordance with an embodiment of the present invention, a continuous conveyor belt cleaning device is provided having a frame mounted adjacent to a portion of the belt surface, a rotational movement mechanism being mounted on the frame and including a rotating shaft having an axis of rotation generally perpendicular to the conveyor belt. A cleaning element holder is mounted on the shaft, and a plurality of individual separate cleaning elements are mounted on the holder and are in contact with the surface of the conveyor belt.

The cleaning elements are preferably removably mounted on the ends of arm portions of the holder, and each element may be attached to an arm portion by means of a resilient member.

The axis of rotation of the rotational movement mechanism may be perpendicular, or at a predetermined angle with respect to a generally planar portion of the conveyor belt.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like elements in the several views.

DESCRIPTION OF THE PREFERRED EMBODIMENTS

Figure 1:
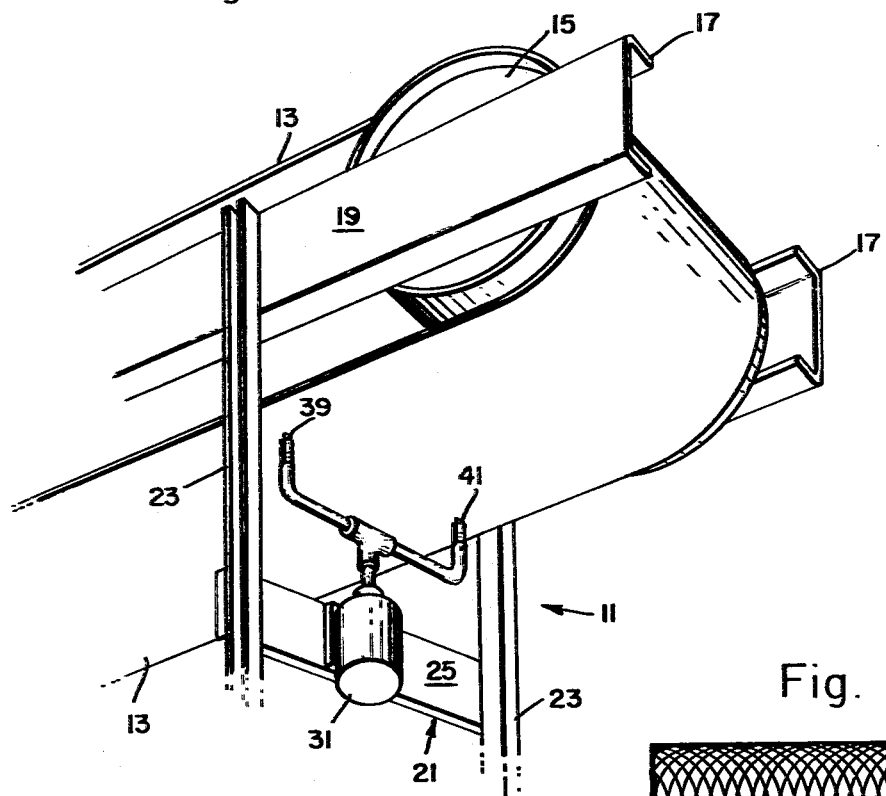
FIG. 1 is a perspective view of a portion of a continuous conveyor belt system showing a belt cleaning device constructed in accordance with an embodiment of the invention.

Referring now to the drawing and more particularly to FIG. 1, there is shown a device 11 for cleaning a moving continuous conveyor belt, generally designated 13. The conveyor belt 13 is shown wrapped about a portion of a conveyor belt pulley 15, the pulley 15 being rotatably mounted adjacent the end 17 of a boom section 19 in a conventional manner. In this embodiment, a generally U-shaped frame 21 is attached at its sides 23 to the boom section 19 adjacent the discharge pulley 15, and its lower, horizontal section 25, is located where the belt 13 leaves the pulley 15.

A cleaning element holder 27 is fixedly mounted to a rotatable shaft 29 extending upwardly from a rotational movement mechanism, such as electric motor 31, for example. The electric motor 31 is of conventional design and is preferably adapted to operate in the environment in which it is to be used. Although not shown, electrical wires are carried by the boom and frame to supply electrical current to the motor 31 in a conventional manner. However, the rotational movement mechanism may alternately be belt or gear driven by mechanical means well known in the art.

In accordance with the embodiment of the invention illustrated in FIG. 1, the cleaning element holder 27 includes an axial portion 33 removably attachable to the motor shaft 29 by conventional means such as set screws 35 (see FIG. 3), for example, and also includes two outward and upward extending arms 37. The arms 37 are preferably symmetrically spaced about 180° apart. Alternately, three arms 37 spaced 120° apart, or even more arms may be used.

Figure 2:
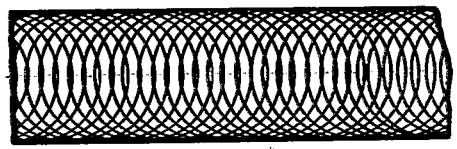
FIG. 2 is a plan view schematically illustrating the overlapping spiral paths defined by the circularly moving cleaning elements of the invention.

At the outer extremities of each of the arms 37 there is removably attached, by conventional nut and bolt combinations, for example, a cleaning element 39 having an upper rectilinear edge 41 in contact with the outer surface 43 of the conveyor belt 13. The element 39 is preferably of a relatively hard material able to withstand, for reasonably long periods of use, the wear normally accompanying the moving contact between the belt material and that of the element 39. One such material is carbide which has demonstrated prolonged life in extremely abrasive conditions. An overlapping spiral pattern 42 is defined on the scrubbed surface of the moving conveyor belt as the elements 39 are rotated in a circular path by the motor 31, as illustrated in FIG. 2.

Figure 3:
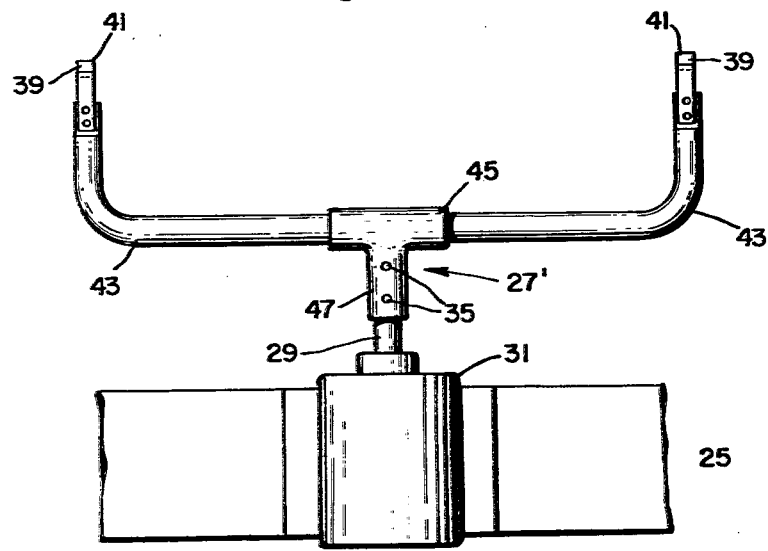
FIG. 3 is an enlarged view of the cleaning mechanism constructed in accordance with another embodiment of the present invention.

Referring now to FIG. 3, there is shown another embodiment of the invention. Here, the cleaning element holder 27' has two oppositely extending arms 37', each held by a hollow T-section 45 that includes a hollow stem portion 47 mounted on the end of the motor shaft 29 and held securely thereon by conventional set screws 35. Except for the number of arms, this embodiment is similar to that shown in FIG. 1.

Figure 4:
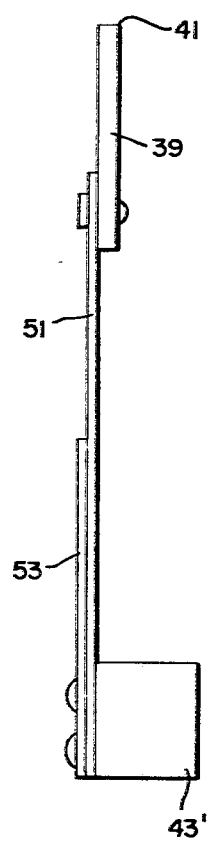
FIG. 4 is an enlarged elevational view of a portion of the belt cleaning device including the spring supported belt cleaning element.
Figure 5:
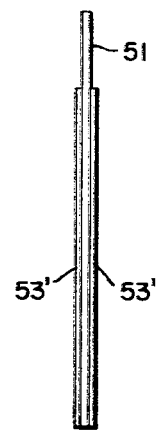
FIG. 5 is an enlarged view of a portion of the belt cleaning device similar to that shown in FIG. 4, but constructed in accordance with another embodiment of the present invention.

In order to provide for variations in positioning of the moving conveyor belt relative to the fixed position of the frame and motor assembly, and assure continuous contact with the belt surface by the cleaning element 39, where desired, the cleaning element 39 is preferably mounted at the outer end 49 of an elongated flat spring 51, for example. The spring 51 may be of spring steel approximately 4 to 6 inches long, 1 to 2 inches wide, and approximately 1/16 inch thick. A thinner backup leaf spring 53, extending only a portion of the length of the spring 51 is shown in FIG. 4. The backup spring 53 is located on one side of the main spring 51 in this embodiment, and one such backup spring 53' is located adjacent each of the sides of the spring 31 in accordance with another embodiment of the invention illustrated in FIG. 5.

Figure 6:
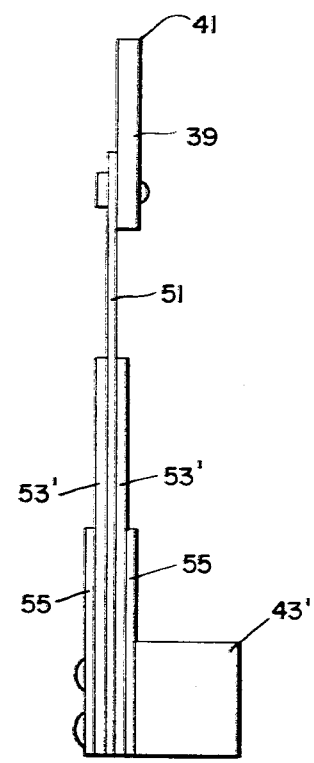
FIG. 6 is a side elevational view of a multi-leaf spring cleaning element support structure constructed in accordance with yet another embodiment of the invention.

FIG. 6 shows yet another embodiment of the invention in which two backup springs, one longer than the other, are mounted alongside each of the sides of the main spring structure 51. The backup spring structure is provided in order to assure that the cleaning element is nearly always in direct contact with the surface of the conveyor belt to be cleaned. Also, these additional springs 55 help prevent twisting of the main leaf spring as the cleaning element is rotated in a circle and in contact with a moving conveyor belt. Further, the backup spring structure helps distribute the bending load over a greater area of the main leaf spring to avoid spring failure due to metal fatigue. Although the presently preferred embodiments of the invention utilize leaf springs, it should be understood that in certain applications, a coil type spring may be utilized to maintain the cleaning element in contact with a moving conveyor belt.

Figure 7:
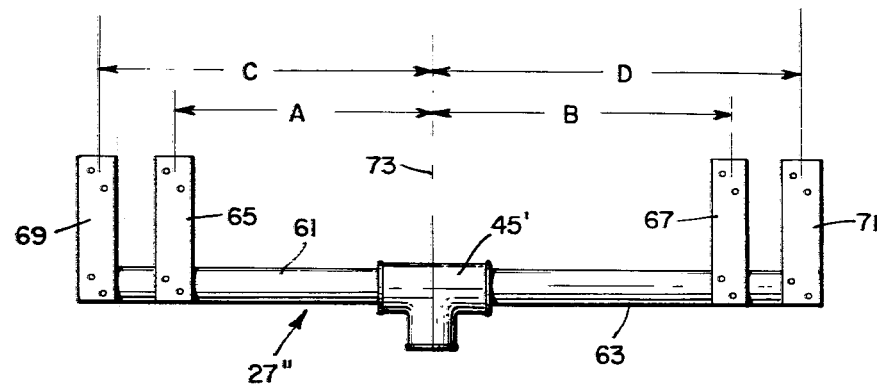
FIG. 7 is an elevational view of a cleaning element holder having a plurality of element holding arms, in accordance with a further embodiment of the invention.

In accordance with a further embodiment of the invention, illustred in FIG. 7, a cleaning element holder 27" includes a first transverse member 61 and a second transverse member 63, each extending from opposite ends of the motor shaft-mounted T-section 45'. Perpendicularly attached to the first and second transverse members are first and second (65, 67), and third and fourth (69, 71) arms, respectively. The arms may be bolted, riveted, welded to machined or cast as part of the members 61 and 63. At the opposite ends of the arms, any conventional means such as bolts, rivets, etc., may be used to mount the cleaning elements 39 and spring mounts, such as those shown in FIGS. 4–6.

FIG. 7 also illustrates that the radius of circles defined by each of the arm-mounted cleaning elements may be different from those defined by the other arms mounted on the members 61 and 63. For example, first arm 65 may be a distance "A" from the axis of rotation 73 of the system, while second arm 67 may be a slightly longer distance "B" therefrom. Likewise, the distance "C" for arm 69 may be greater than "B" but less than "D", for arm 71. In this way, the cleaning action of each of the cleaning elements may overlap to provide additional thoroughness in cleaning action.

Figure 8:
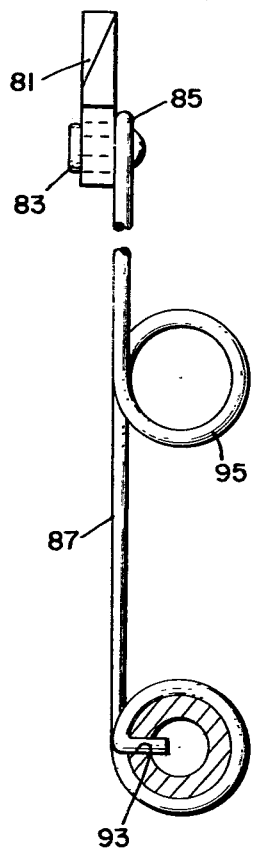
FIGS. 8 and 9 are, respectively, front and side elevations of another embodiment of the invention.
Figure 9:
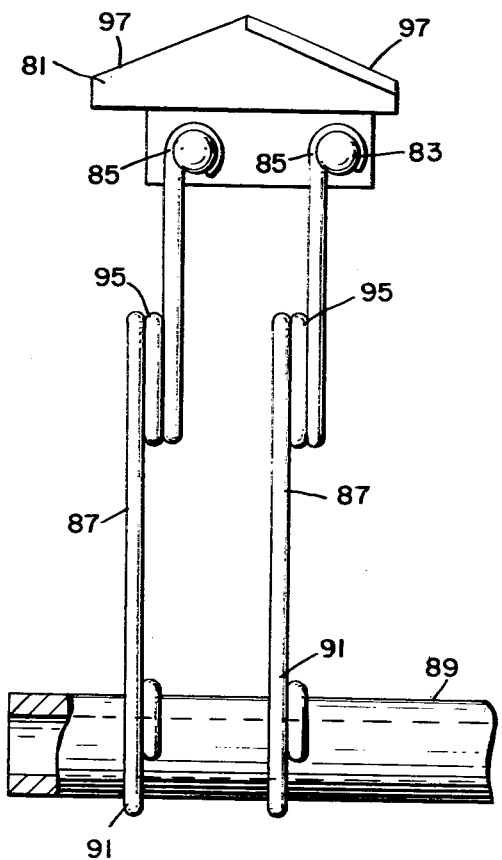

Referring now to FIGS. 8 and 9, there is shown yet a further embodiment of the invention. In this embodiment, a cleaning element 81 is mounted by means of rivets 83, for example, at the ear-like ends 85 of a pair of wire spring element holding members 87. The members 87 are attached to a rotatable transverse arm 89, and elements 81 may be mounted on the arm 89 equal distances from the axis of rotation. Alternatively, they may be mounted in a manner similar to the arrangement illustrated in FIG. 7. Any conventional means may be used to attached the lower ends 91 of the wire spring members 87 to the arm 89. For example, the members 87 may be mounted on an arm having a circular cross section by fabricating the members 87 so that they make one complete turn around the arm 89 before sharply turning inwardly a short distance into holes 93 as best seen in FIG. 9.

Each wire spring member also includes a looped portion 95 intermediate the ends of the members to provide additional spring action to help maintain the wiping surfaces 97 of elements 81 in contact with the belt surface to be cleaned.

Figure 10:
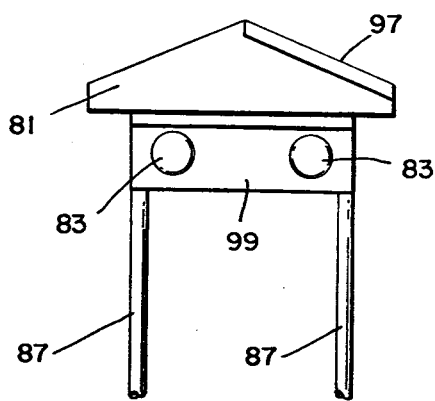
FIGS. 10 and 11 are variations thereof.
Figure 11:
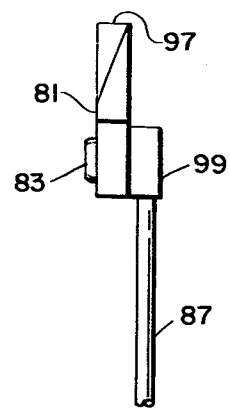

In the embodiments of FIGS. 8 & 9 and 10 & 11, the wiping surfaces of the elements are comprised of two downwardly sloping components so that a better wiping contact may be had in rotating positions both upstream and downstream of the axis of rotation of the shaft (not shown) supporting the arm 89. Additional strength and wiper action performance may be obtained by the use of optional steel sheet metal plates 99 that may be spot welded, for example, to the spring members 87 and riveted to the elements 81, as shown in FIGS. 10 and 11.

From the foregoing it should be evident that the invention constitutes a new and improved conveyor belt cleaning device that avoids the tendency to load, is long lasting, reliable and efficient. Although certain materials and processes have been identified specifically herein, it should be understood that other materials and processes may be utilized which perform or provide the same or similar functions.

What is claimed is:

1. A device for cleaning a moving continuous conveyor belt, comprising:
   a frame mounted adjacent said moving continuous conveyor belt;
   a rotational movement means mounted on said frame and including a rotating shaft;
   a cleaning element holder mounted on said shaft and including a plurality of arms extending toward a relatively planar surface of said conveyor belt; and
   at least one individual, separate cleaning element removably mounted on the extremity of each of said arms, wherein said cleaning elements are rotated by said rotational movement means in contact with said planar surface to define an overlapping spiral path thereon.

2. A device for cleaning a moving continuous conveyor belt according to claim 1, wherein said cleaning element has a belt-wiping surface with two inclined surface portions.

3. The device for cleaning a moving continuous conveyor belt according to claim 1, wherein said cleaning element is a carbide plate having a rectilinear cleaning edge in contact with said conveyor belt.

4. The device for cleaning a moving continuous conveyor belt according to claim 1, wherein said rotating shaft has an axis of rotation perpendicular to said planar surface.

5. The device for cleaning a moving continuous conveyor belt according to claim 1, wherein said cleaning element holder includes holder means including a resilient structure attached to said cleaning element for resiliently supporting said cleaning element in contact with said surface of said conveyor belt.

6. A device for cleaning a moving continuous conveyor belt according to claim 5, wherein said resilient structure includes a pair of approximately parallel wire spring members having a coiled portion intermediate the ends thereof.

7. A device for cleaning a moving continuous conveyor belt according to claim 6, wherein a metal plate is attached to said cleaning element and to said wire spring members at the juncture thereof.

8. The device for cleaning a moving continuous conveyor belt according to claim 1, wherein said cleaning element holder includes an elongated spring member being fixedly attached at one of its extremities to said cleaning element.

9. The device for cleaning a moving continuous conveyor belt according to claim 8, wherein said cleaning element holder also includes a backup spring leaf fixedly attached at one of its ends to a base portion of said spring member opposite said cleaning element and its opposite end in sliding contact with an intermediate portion of said spring member.

10. The device for cleaning a moving continuous conveyor belt according to claim 9, wherein said cleaning element holder includes a backup spring leaf on each side of said spring member.

11. The device for cleaning a moving continuous conveyor belt according to claim 8, wherein said cleaning element holder also includes a double leaf backup spring structure fixedly attached at one of its ends to a base portion of said spring member opposite said cleaning element and its opposite end in sliding contact with an intermediate portion of said spring member, said structure including a relatively longer spring leaf adjacent said spring member and a relatively shorter spring leaf adjacent the side of said relatively longer spring leaf opposite said spring member.

12. The device for cleaning a moving continuous conveyor belt according to claim 11, wherein said cleaning element holder includes a double leaf backup spring structure on each side of said spring member.

* * * * *